United States Patent [19]

Detweiler

[11] Patent Number: 4,643,352

[45] Date of Patent: Feb. 17, 1987

[54] TEMPERATURE COMPENSATING VACUUM DELAY VALVE

[75] Inventor: Charles A. Detweiler, Durand, Mich.

[73] Assignee: Tom McGuane Industries, Inc., Madison Heights, Mich.

[21] Appl. No.: 871,140

[22] Filed: Jun. 2, 1986

Related U.S. Application Data

[63] Continuation of Ser. No. 677,511, Dec. 3, 1984, abandoned.

[51] Int. Cl.[4] .............................................. G05D 23/10
[52] U.S. Cl. .................................... 236/48 R; 236/87; 236/101 C
[58] Field of Search .................. 236/87, 48 R, 101 C; 261/39 B; 137/513.5

[56] References Cited

U.S. PATENT DOCUMENTS

| | | | |
|---|---|---|---|
| 3,319,888 | 5/1967 | Greager | 236/87 |
| 3,729,132 | 4/1973 | Ludwig | 236/87 X |
| 3,991,731 | 11/1976 | Benjamin | 261/39 B |
| 4,027,634 | 6/1977 | Benjamin | 261/39 B |
| 4,239,152 | 12/1980 | Kitamura et al. | 236/48 R |
| 4,239,154 | 12/1980 | Inada et al. | 236/87 |
| 4,382,899 | 5/1983 | Johnson | 261/39 B |

Primary Examiner—William E. Tapolcai
Attorney, Agent, or Firm—Barnes, Kisselle, Raisch, Choate, Whittemore & Hulbert

[57] ABSTRACT

For use in applying a vacuum to a choke pull-off assembly, a temperature compensating vacuum delay valve comprising a housing a first opening adapted to be connected to manifold vacuum and a second opening adapted to be connected to a choke pull-off assembly which functions to partially open the choke when a vacuum is applied. The housing includes a valve disc, yieldingly urged against the seat. A restrictor permits restricted flow between the one side of the valve disc and the other side of the valve disc when the valve disc is in sealing and a bi-metallic disc is positioned in the housing between the first opening and the valve disc and is operable upon predetermined change of temperature to move the valve disc away from a seat and thereby permit unrestricted flow between the first opening and the second opening. The valve disc is spring loaded against the seat such that it will open and allow unrestricted flow in the reverse direction.

10 Claims, 7 Drawing Figures

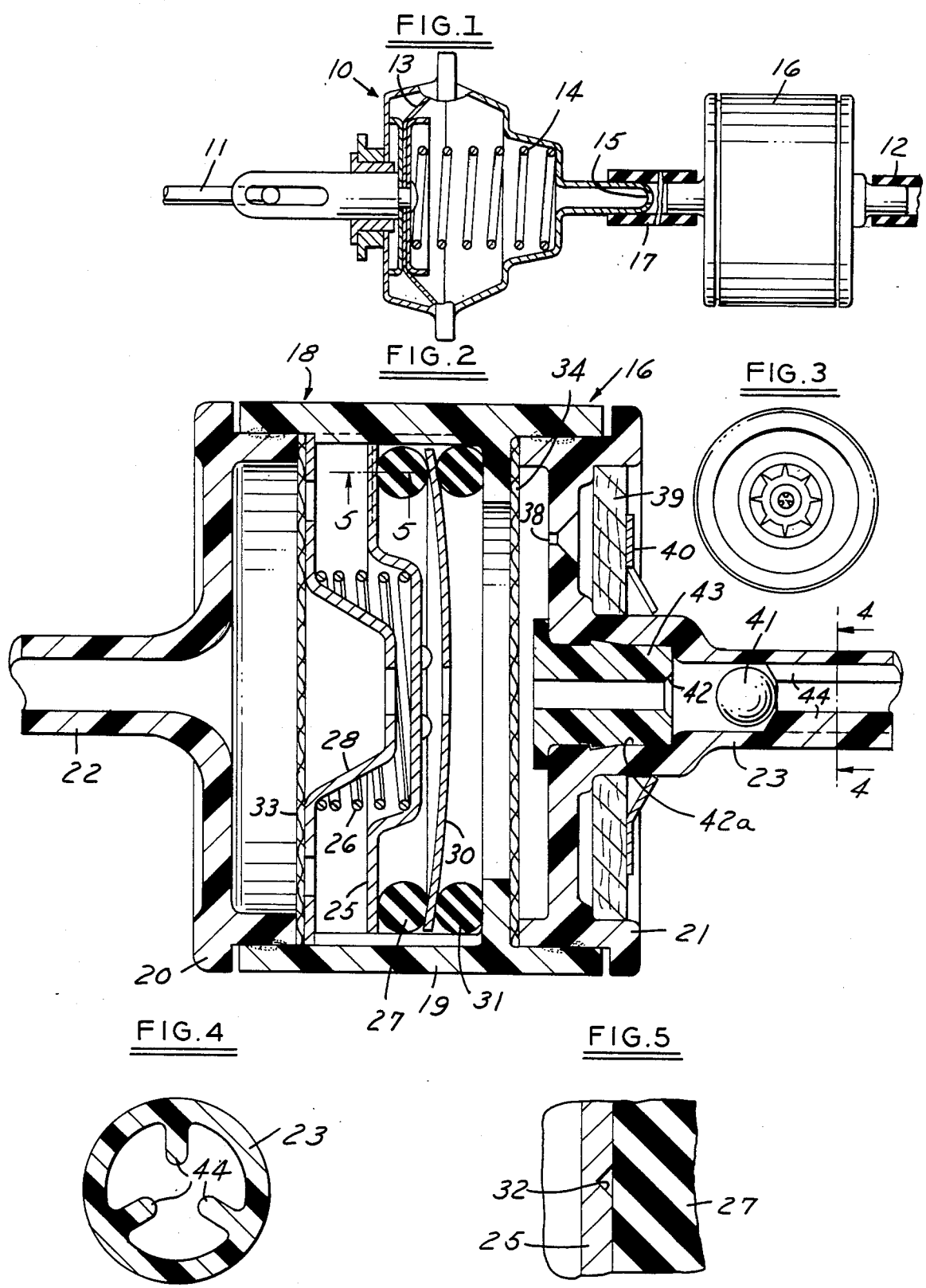

TEMPERATURE COMPENSATING VACUUM DELAY VALVE

This application is a continuation, of application Ser. No. 677,511, filed Dec. 3, 1984, now abandoned.

This invention relates to carburetor systems and particularly to controls for the choke of a carburetor.

BACKGROUND AND SUMMARY OF THE INVENTION

In internal combustion engines, it is common to utilize a carburetor that includes a choke. The choke functions when the engine is cold to provide a rich mixture. As the engine begins to run and the vacuum increases, a choke pull-off is provided that functions under the action of manifold vacuum to return the choke to the open position so that the fuel air mixture is at a normal less rich mixture. A typical system of this type is shown in U. S. Pat. No. 3,773,023 which shows a diaphragm operated choke pull-off that also includes a check valve. Other typical systems are shown in U. S. Pat. Nos. 3,991,731 and 4,382,899. U. S. Pat. No. 3,991,731 describes a Choke Pull-Off assembly incorporating the following features: time delay valve, filter, purge air flow with filter, and a check ball.

One of the problems with such an arrangement is that any delay built into the Choke Pull-Off assembly is relatively constant at all temperatures. It may be desirable to provide a longer time delay at low temperatures (below 20° F.) and a shorter time delay, or no delay, at moderate temperatures, (above 30° F.).

Accordingly, among the objectives of the present invention are to provide a system wherein the choke pull-off action will be delayed whenever the temperature is below a predetermined value; and when the temperature is above the predetermined value, there will be no delay and the flow of vacuum to the choke pull-off will be instantaneous and unrestricted, while incorporating the desirable features described in U. S. Pat. No. 3,991,731.

In accordance with the invention, the temperature compensating vacuum delay valve comprises a housing having a first opening adapted to be connected to manifold vacuum and a second opening adapted to be connected to a choke pull-off assembly which functions to partially open the choke when a vacuum is applied to the choke pull-off assembly. The housing includes a valve disc, a seat, and means yieldingly urging the valve disc against said seat. A restrictor permits restricted flow between the one side of the valve disc and the other side of the valve disc when the valve disc is in sealing position and a bi-metallic disc is positioned in the housing between the first opening and the valve disc and is operable upon predetermined change of temperature to move the valve disc away from a seat and thereby permit unrestricted flow between the first opening and the second opening.

DESCRIPTION OF THE DRAWINGS

FIG. 1 is a partly schematic view of a portion of a carburetor choke control system embodying the invention.

FIG. 2 is a longitudinal sectional view on an enlarged scale of a temperature compensating vacuum delay valve utilized in the system shown in FIG. 1.

FIG. 3 is an end view of the temperature compensating vacuum delay valve as viewed from the right as shown in FIG. 2.

FIG. 4 is a fragmentary sectional view taken along the line 4—4 in FIG. 2.

FIG. 5 is a fragmentary sectional view taken on an enlarged scale along the line 5—5 in FIG. 2.

DESCRIPTION

Figure 6:
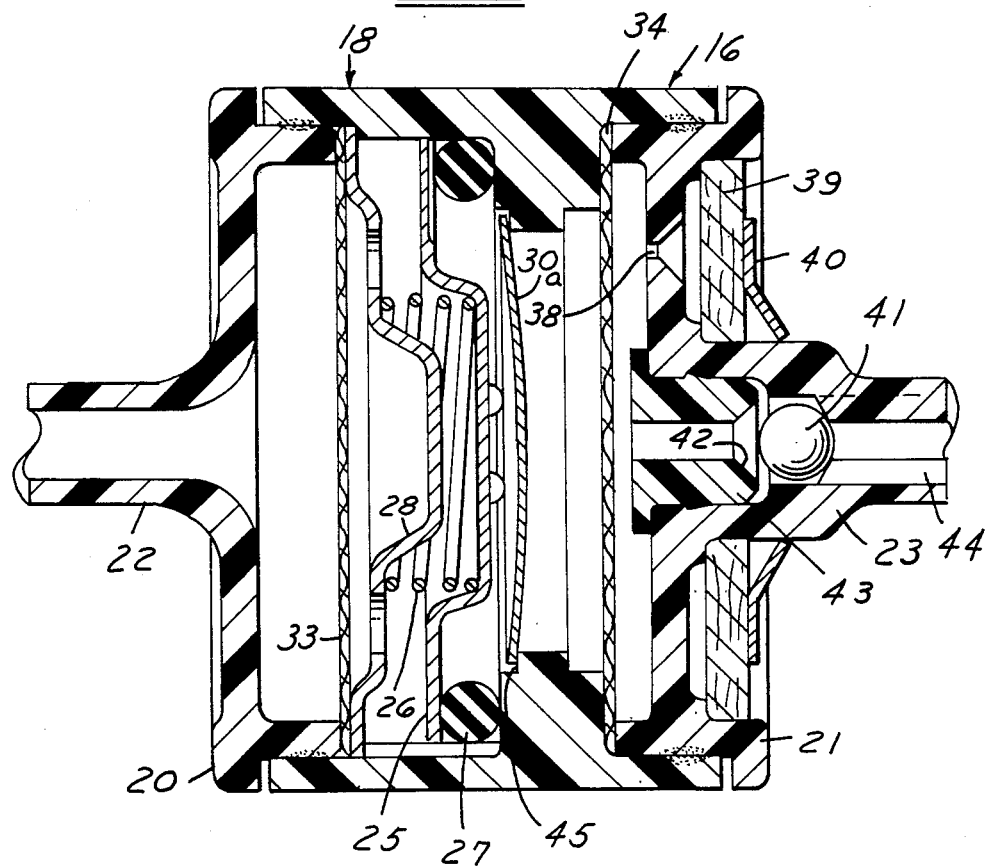
FIG. 6 is a longitudinal sectional view of a modified form of valve.

Referring to FIG. 1, a conventional choke pull-off assembly 10 is normally interposed between the choke linkage 11 and a vacuum connection 12 to the manifold of the engine. Choke pull-off assembly 10 includes a diaphragm 13 yieldingly urged by a spring 14 into a position where the choke is closed. When vacuum is applied to the opening 15, the choke is actuated through the linkage to partially open the choke. A temperature compensated vacuum delay valve 16 is interposed between the vacuum connection 12 and choke pull-off valve 10 and connected thereto by a tube 17.

Referring to FIGS. 2–4, the temperature compensated vacuum delay valve 16 includes a housing 18 made of plastic and comprising a cylindrical part 19 and end members 20, 21. End member 20 includes an integral tube 22 defining an opening toward the choke pull-off 10 and end member 21 includes a tubular portion 23 defining an opening connecting to the manifold vacuum.

A valve disc 25 is movably mounted within the cylindrical portion 19 and yieldingly urged by a compression spring 26 toward a seat defined by an O-ring 27. Spring 26 is interposed between the valve disc 25 and a spring retainer 28. A bi-metallic disc 30 is interposed between O-ring 27 and a second O-ring 31 and functions upon change of temperature to move by a snap action or gradually and, in turn, engage the valve disc 25 and move it away from its seat formed by sealing ring 27. Valve disc 25 includes a radial groove 32 that functions as a restrictor orifice so that there is always communication through the groove 32 between one side and the other of the valve disc 25 (FIG. 5). The valve 16 further includes filters 33, 34 that are interposed between integral flanges 35, 36 on end members 20, 21 and portions of the body 19 to retain the filters in position. The valve further includes a purge orifice 38 that provided constant communication to the atmosphere. A filter 39 filters the air entering the housing and is held in position by a frictional spring retainer 40.

The valve further includes a check valve 41 in the form of a ball that operates against a seat 42 that comprises an insert 43 frictionally held in an annular recess 42a of the end member 21. The ball 41 operates between the seat and retaining ribs 44 in the projecting portion 23 (FIG. 4).

Before the engine starts, and if the temperature is below a predetermined level the parts are in the position shown in FIG. 2. In this position, the choke is in the closed position thereby providing a rich mixture to the engine. As the engine starts and vacuum begins to build up, vacuum is caused to draw air at a predetermined rate from the right side of the diaphragm of the choke pull-off through the groove 25 to the manifold vacuum line 12. Air is also drawn through the purge filter 39 and purge orifice 38. This gradually moves the diaphragm 13 of the choke pull-off valve 10 drawing the choke toward an open position. If the temperature is above a predetermined level, the bimetal disc 30 holds the valve disc 25 away from its seat 27 so that the vacuum will be freely applied to the choke pull-off assembly 10 partially opening the choke valve. The purged flow through orifice 38 functions to maintain clean air flow to the engine and insure that no oil or fuel vapor condenses in the valve. If there is a backfire, the check valve 41 functions to prevent the pressure from being applied to the parts of the valve 16 including the filter.

In the form of the invention shown in FIG. 6 the disc 30a is of smaller diameter than the valve disc 25 and functions between a shoulder on the housing and the O-ring 27.

Figure 7:
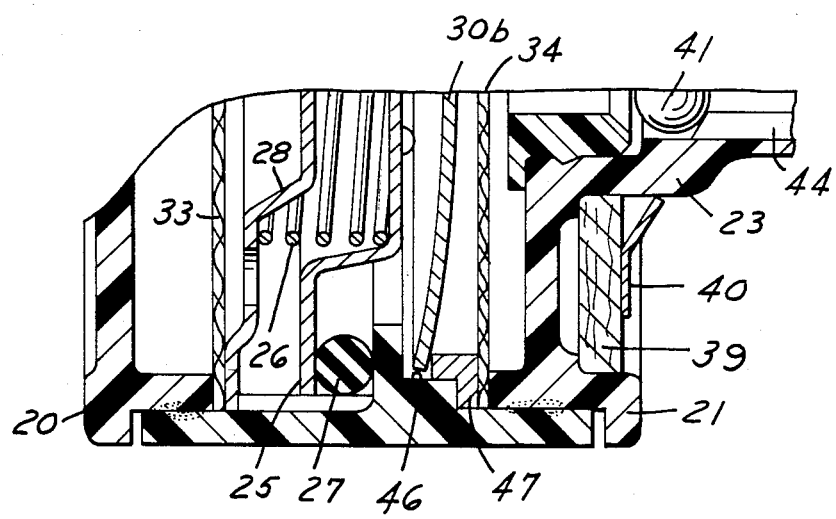
FIG. 7 is a fragmentary longitudinal sectional view of another modified form of valve.

In the form of the invention shown in FIG. 7, the disc 30d of the same diameter as the disc 30 shown in FIG. 3 is positioned in a groove defined by a retaining ring 47 press fitted in the housing.

I claim:

1. For use in applying a vacuum to a choke pull-off assembly, a temperature compensating vacuum delay valve comprising
   a plastic housing having a first opening adapted to be connected to manifold vacuum,
   a second opening adapted to be connected to a choke pull-off valve which functions to close the choke when a vacuum is applied to the choke pull-off assembly,
   said housing including a valve disc,
   a resilient O-ring,
   spring means yieldingly urging the periphery of said valve disc against said O-ring,
   restrictor means on said valve disc in the area of said resilient seat permitting restricted flow between the one side of the valve disc and the other side of the valve disc when the valve disc is in sealing position,
   a purge opening to the atmosphere providing communication to the side of the valve disc adjacent the first opening,
   a check valve associated with said first opening and operable to substantially restrict flow of pressure through said first opening into said housing,
   and a snap action bi-metallic disc positioned in said housing between said first opening and said valve disc, said valve disc having a central portion extending axially toward the center of said snap action bi-metallic disc, said bi-metallic disc being normally out of engagement with said central portion of said valve disc such that said snap action disc is operable upon predetermined change of temperature to engage the central portion of said valve disc and move said valve disc axially away from said O-ring and thereby permit unrestricted flow between the entire periphery of said O-ring and said valve disc between said first opening and said second opening.

2. The valve set forth in claim 1 including filter means interposed between said valve disc and said first opening, and filter means interposed between said valve disc and said second opening.

3. The valve set forth in claim 2 wherein said restrictor means comprises a groove in said valve disc.

4. The check valve set forth in claim 1 wherein said seat associated with said valve disc comprises an annular resilient O-ring.

5. The valve set forth in claim 1 including a second resilient O-ring interposed between said bi-metallic disc and said housing,
   the periphery of said bi-metallic disc being interposed between said rings.

6. The valve set forth in claim 1 wherein said seat comprises a sealing O-ring interposed between the valve disc and a portion of said housing.

7. The valve set forth in claim 1 including a spring retainer disc, said spring means being interposed between the valve disc and said spring retainer disc.

8. The valve set forth in claim 7 wherein said valve includes a filter interposed between the spring retainer disc and the housing.

9. The valve set forth in claim 1 including a check valve in said first opening operable to interrupt the flow of pressure into said housing in the event of a back-fire, said check valve including a seat inserted into said housing.

10. The valve set forth in claim 1 wherein said housing comprises a tubular portion and end walls,
    said end walls having respectively the first and second openings therein.

* * * * *